F. J. RICHARDS.

DENTAL PLUGGER.

No. 11,502. Reissued July 2, 1895.

Witnesses:

Theo. L. Popp.

Chas. F. Burkhardt.

Frank J. Richards Inventor.

By Wilhelm A. Bonnet

Attorneys.

UNITED STATES PATENT OFFICE.

FRANK J. RICHARDS, OF WILLIAMSPORT, PENNSYLVANIA, ASSIGNOR TO THE BUFFALO DENTAL MANUFACTURING COMPANY, OF BUFFALO, NEW YORK.

DENTAL PLUGGER.

SPECIFICATION forming part of Reissued Letters Patent No. 11,502, dated July 2, 1895.

Original No. 494,227, dated March 28, 1893. Application for reissue filed July 19, 1894. Serial No. 518,060.

*To all whom it may concern:*

Be it known that I, FRANK J. RICHARDS, a citizen of the United State, residing at Williamsport, in the county of Lycoming and State of Pennsylvania, have invented a new and useful Dental Plugger, of which the following is a specification.

My invention relates to improvements in dental pluggers, and has special reference to the holder for the condensing-points, whereby a direct blow may be given in a curved direction, the same being fully described hereinafter in connection with the drawings, and specifically pointed out in the appended claims.

Figure 1:
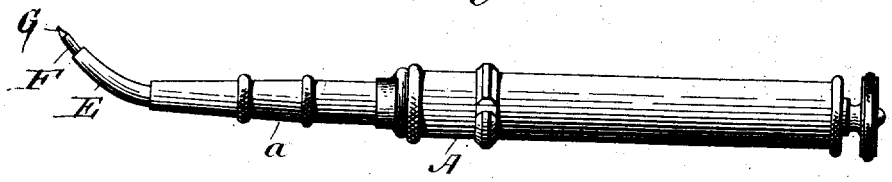
Figure 2:
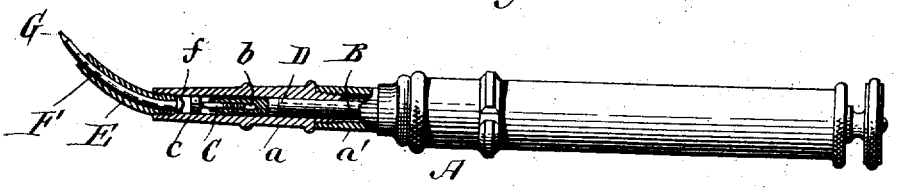
Figure 3:
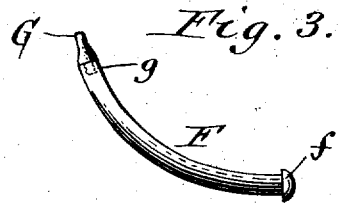
Figure 4:
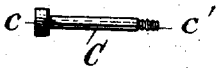

In the drawings, Figure 1 is a side view of a plugger embodying my improvements. Fig. 2 is a sectional view of that portion of the plugger which bears my improvement. Fig. 3 is a detached detail view of the holder. Fig. 4 is a similar view of the striking-pin.

The plugger which is shown in the drawings to illustrate the application of my invention is of the class known as "hand-pluggers;" but my improvement is equally applicable to pluggers which are used in connection with dental engines and which are operated by electricity, &c., the invention lying in the tool-holder and manner of mounting and operating the same. Therefore the details of construction of that portion of the plugger which is illustrated in the drawings, referring to the operation of the plunger, &c., will not be described herein.

A designates the casing of the plugger, the section *a* of which forms the handle, said handle-section being covered by the tubular cap-section *a'*, through which projects the plunger B. The end of the plunger is provided with a tool-socket *b*, provided with screw-threads near its bottom, this feature being found in all the ordinary pluggers now in use and being designed to receive the condensing-point. (Not shown in my improvement in connection with this portion of the instrument.)

In the socket *b* fits a striking-pin C, having a flattened head *c* and a screw-threaded tip *c'* to engage the screw-threaded portion of the socket. This pin may, if preferred, be provided with the socket to receive the screw-threaded end of the plunger, but the construction shown in the drawings is adopted as the most practical and as allowing my improvement to be applied to the pluggers now in use. A tapered sheath D fits over the projecting end of the plunger and screws into the outer end of the cap, above described, the head upon the extremity of the striking-pin being located close to the outer end of the sheath. In the end of the sheath screws a curved guide-tip E, which may comprise any desired portion of a circle from an octant to a quadrant, the length of the arc being determined by the requirements of the particular case, and in this tip fits and operates the holder F, similar in shape to the tip—namely, an arc of a true circle and slightly longer than the same. The inner or rear end of the holder is flattened to form a head *f*, which is located within the sheath in contact with the head upon the extremity of the striking-pin. The condensing-point G fits in a socket *g* in the end of the holder or may be formed as a part of the holder, as preferred, the latter form being shown in the detail view, Fig. 3.

The plunger B and the striking-pin C, which is attached thereto, form together a striker which has a rectilinear reciprocating movement in the casing of the instrument. This striker receives at its inner end the blow of the hammer, which latter and its operating mechanism may, as hereinbefore explained, be constructed and operated in any usual way and transmits the blow to the inner end of the curved holder.

The operation of the improved plugger is similar to that of others now in use. In the case of the hand-instrument shown in the drawings the condensing-point is pressed against the filling, thus repressing the point and compressing and operating a spring (not shown) within the casing, whereupon said spring at a given point is released and the plunger is given a forward impetus, which gives the effect of a blow upon the rear end of the holder. The holder and the tip being shaped, as described, in accordance with the arc of a circle the holder is capable of a free longitudinal movement and a blow upon its rear end has the same effect as a similar blow upon the rear end of a straight holder.

The utility of this improvement in connection with the art of dentistry need not be described at length herein. Briefly, it enables the operator in filling rear teeth, or those which are difficult to reach, as when the cavity is in the rear side of a tooth or can only be reached from the rear side, to condense the filling squarely into place by an impact in the direction in which the filling is to be forced, the same being accomplished with less discomfort to the patient and greater ease to the operator. The condensing-point which I have shown in connection with my invention is also curved to correspond with the curve of the holder, thereby bringing all of the parts in the line of the blow. A straight condensing-point may be used.

Having thus described my invention, what I claim, and desire to secure by Letters Patent, is—

1. The combination with a straight striker and its casing in which the striker moves with a rectilinear reciprocating movement, of a curved guide tip secured to said casing, and a curved holder arranged in said guide tip and arranged with its inner end in the path of said striker, substantially as specified.

2. The combination with a straight plunger, a striking pin fitting in a socket in the end of said plunger, a curved guide tip E and a curved holder mounted in said guide tip with its inner end in the path of the striking pin, substantially as specified.

3. The combination with a straight plunger and an inclosing casing, of a tapered sheath fitted to the end of the casing to inclose the end of the plunger, a striking pin fitting in a socket in the end of the plunger, a curved tip fitted in the reduced end of said sheath, and a curved holder, slidably fitted in the tip with its inner end in the path of the striking pin, substantially as specified.

In testimony that I claim the foregoing as my own I have hereto affixed my signature in the presence of two witnesses.

FRANK J. RICHARDS.

Witnesses:

L. B. HARTMAN,

F. G. KINYON.